(12) United States Patent
Lin

(10) Patent No.: US 9,477,055 B1
(45) Date of Patent: Oct. 25, 2016

(54) OPTICAL MODULE AND FIXING APPARATUS THEREOF

(71) Applicant: Yu-Ching Lin, Kaohsiung (TW)

(72) Inventor: Yu-Ching Lin, Kaohsiung (TW)

( * ) Notice: Subject to any disclaimer, the term of this patent is extended or adjusted under 35 U.S.C. 154(b) by 0 days.

(21) Appl. No.: 14/817,355

(22) Filed: Aug. 4, 2015

(30) Foreign Application Priority Data

May 1, 2015 (TW) .............................. 104114059 A

(51) Int. Cl.
*G02B 6/42* (2006.01)

(52) U.S. Cl.
CPC ............. *G02B 6/4231* (2013.01); *G02B 6/423* (2013.01); *G02B 6/4204* (2013.01); *G02B 6/426* (2013.01); *G02B 6/4214* (2013.01)

(58) Field of Classification Search
CPC G02B 6/4204; G02B 6/4214; G02B 6/4231; G02B 6/426
USPC .......................................................... 385/78
See application file for complete search history.

(56) References Cited

U.S. PATENT DOCUMENTS

| 8,297,856 B2 * | 10/2012 | Banal, Jr. ............. G02B 6/4292 385/135 |
| 8,770,855 B2 | 7/2014 | Miller |
| 8,888,380 B2 | 11/2014 | Hung et al. |
| 8,899,847 B2 | 12/2014 | Lin et al. |
| 8,923,670 B2 | 12/2014 | Zbinden et al. |
| 8,936,403 B2 | 1/2015 | Howard et al. |

* cited by examiner

*Primary Examiner* — Ryan Lepisto
(74) *Attorney, Agent, or Firm* — Rosenberg, Klein & Lee

(57) ABSTRACT

An optical module includes an optical lens block, an optical fiber connector, a fixing sheet, a fixing pin, two fixing arms, two elastic sheets and two elastic engagement portions. The optical fiber connector is optically coupled to the optical lens block. The fixing pin is inserted into a first opening on the optical lens block and a second opening on the optical fiber connector. The two fixing arms are positioned at the fixing sheet. The optical lens block and optical fiber connector are positioned between the fixing arms. The elastic sheets are respectively positioned at the front ends of the fixing arms. The elastic sheets press upon the optical lens block to push the optical lens block. The elastic engagement portions are respectively positioned at the rear end of the fixing arms and press upon the optical fiber connector to push the optical fiber connector.

12 Claims, 7 Drawing Sheets

US 9,477,055 B1

OPTICAL MODULE AND FIXING APPARATUS THEREOF

RELATED APPLICATION

The present application is based on and claims priority to Taiwanese Application Number 104114059, filed May 1, 2015, the disclosure of which is hereby incorporated by reference herein in its entirety.

BACKGROUND

1. Technical Field

The disclosure relates to an optical module and fixing apparatus thereof.

2. Description of the Related Art

Reference is now made to FIG. 1, the conventional optical engine includes an optical fiber connector 110, an optical lens block 120 and a printed circuit board 130. The printed circuit board 130 is provided with a driving integrated circuit 131 and a plurality of active optical chips 132. The active optical chips 132 may include laser sources and photo diodes. The driving integrated circuit 131 is electrically coupled to the active optical chips 132 to serve the purpose of interfacing the active optical chips 132 with external high-speed electrical system. The optical lens block 120 may be made of optically transparent material to serve the purpose of coupling light between the active optical chips 132 and the optical fibers in the optical fiber connector 110. The optical fiber connector 110 includes a plurality of optical fibers to be optically coupled to the optical lens block 120 so that the optical lens block 120 may optically connect the optical fibers with the active optical chips 132.

However, there exists no good apparatus to securely bind the optical fiber connector 110 and the optical lens block 120 together.

SUMMARY

The present disclosure provides an optical module.

In one embodiment, the optical module according to the present disclosure includes an optical lens block, an optical fiber connector, a fixing sheet, a fixing pin, two fixing arms, two elastic sheets and two elastic engagement portions. A first opening is formed on the optical lens block. A second opening is formed on the optical fiber connector. The optical fiber connector is optically coupled to the optical lens block. The fixing pin is inserted into the first and second openings. The two fixing arms are positioned at the fixing sheet and located to face each other. The optical lens block and optical fiber connector are positioned between the fixing arms. The elastic sheets are respectively positioned at the front ends of the fixing arms. The elastic sheets press upon the optical lens block to push the optical lens block toward the optical fiber connector. The elastic engagement portions are respectively positioned at the rear end of the fixing arms. The elastic engagement portions press upon the optical fiber connector to push the optical fiber connector toward the optical lens block.

The present disclosure further provides an apparatus of fixing optical module.

In one embodiment, the apparatus of fixing optical module according to the present disclosure includes a fixing sheet, a first pin stand, a fixing pin, two fixing arms, two elastic sheets and two elastic engagement portions. The fixing pin is positioned at the first pin stand. The two fixing arms are positioned at the fixing sheet and located to face each other. The elastic sheets are respectively positioned at the front ends of the fixing arms. The elastic sheets are configured to press upon an optical lens block to push the optical lens block toward an optical fiber connector. The elastic engagement portions are respectively positioned at the rear end of the fixing arms. The elastic engagement portions are configured to press upon the optical fiber connector to push the optical fiber connector toward the optical lens block. The fixing pin is configured to insert into the optical lens block and the optical fiber connector.

The foregoing, as well as additional objects, features and advantages of the disclosure will be more readily apparent from the following detailed description, which proceeds with reference to the accompanying drawings.

BRIEF DESCRIPTION OF THE DRAWINGS

FIG. 8 is a cross-sectional view taken along line 8-8 of FIG. 7a.

DETAILED DESCRIPTION OF THE PREFERRED EMBODIMENT

Figure 2:
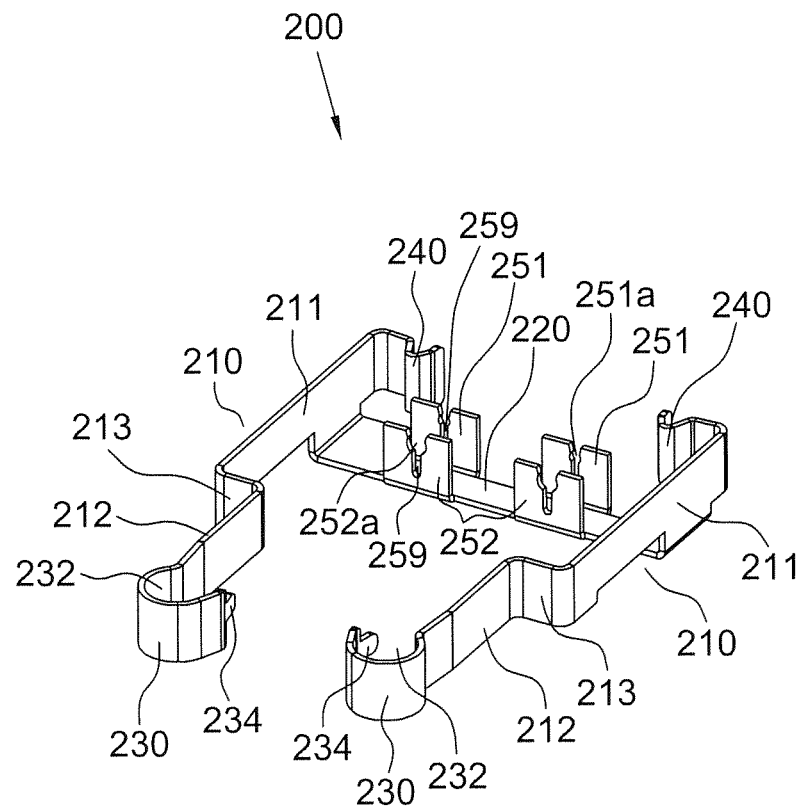
FIG. 2 is an elevated perspective view of the fixing frame of apparatus of fixing optical module of the present disclosure.

Reference is now made to FIG. 2, the apparatus of fixing optical module of the present disclosure includes a fixing frame 200. The fixing frame 200 may be made with metal and includes two opposing fixing arms 210. Each of the fixing arms 210 is comprised of a front section 211, a rear section 212 and a middle section 213. The middle section 213 connects the front section 211 with the rear section 212 and is substantially perpendicular to the front and rear sections 211, 212. The distance between the two front sections 211 is greater than that between the two rear sections 212. The two front sections 211 of the fixing arms 210 are respectively connected to two opposing sides of an elongated fixing sheet 220. An elastic engagement portion 230 is formed at the rear end of the rear section 212. The engagement portion 230 is curved. In one embodiment, the engagement portion 230 has a C-shaped cross section and defines a notch 232 facing the fixing sheet 220. Locate at the rear end of the engagement portion 230 is a protrusion 234 extending toward the fixing sheet 220. An elastic sheet 240 is formed at the front end of the front section 211 of the fixing arm 210. In one embodiment, the engagement portion 230, the elastic sheet 240 and the fixing arm 210 are integrally formed with each other.

The two opposing sides of the fixing sheet 220 are respectively connected to the two front sections 211 of the fixing arms 210. Two pin stands 251 and two pin stands 252 perpendicularly extend respectively from the other two opposing sides of the fixing sheet 220. The pin stands 251 respectively face the pin stands 252. The pin stands 251 are closer to the elastic sheets 240 than the opposing stands 252 while the pins stands 252 are closer to the engagement portions 230 than the opposing stands 251. A slot 259 vertical to the fixing sheet 220 is formed in each of the pin stands 251, 252. A break 251a in communication with the slot 259 is formed in the pin stand 251 and a break 252a in communication with the slot 259 is formed in the pin stand 252. The breaks 251a respectively face the breaks 252a and are smaller than the breaks 252a.

Figure 3:
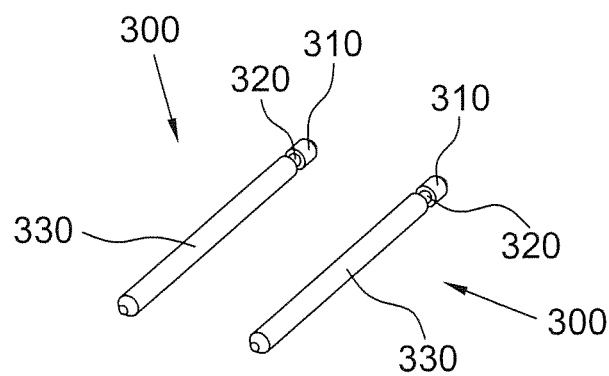
FIG. 3 is an elevated perspective view of the fixing pins of apparatus of fixing optical module of the present disclosure.
Figure 4:
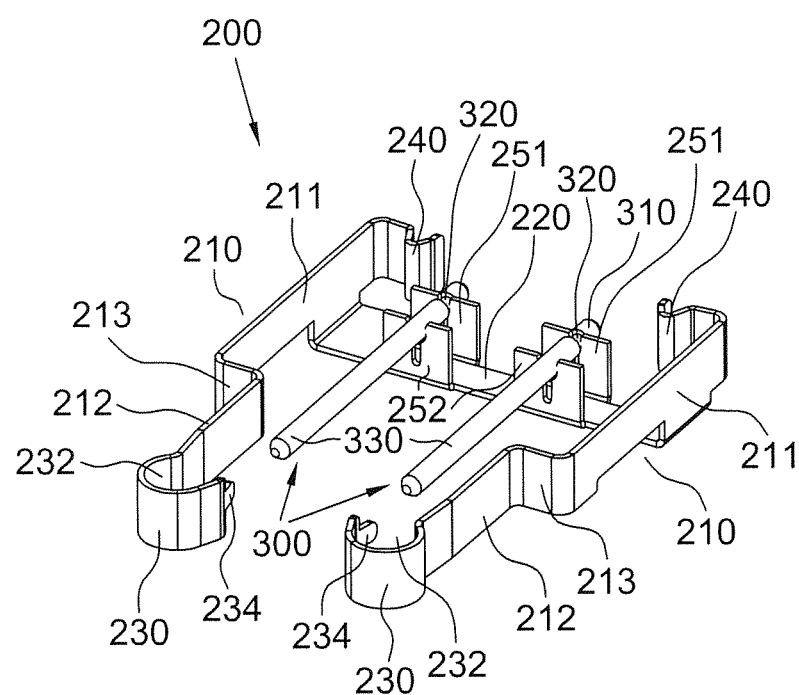
FIG. 4 is an elevated perspective view of apparatus of fixing optical module of the present disclosure.

Reference is now made to FIG. 3, the apparatus of fixing optical module of the present disclosure further includes at least one, for example two fixing pins 300. The fixing pin 300 is generally of cylindrical shape and includes a head 310, a body 330 and a neck 320 connecting with the head 310 and neck 320, wherein the neck 320 has an outer diameter that is smaller than the outer diameters of the head 310 and body 330. Reference is now made to FIG. 4, which is an elevated perspective view of apparatus of fixing optical module of the present disclosure. The two fixing pins 300 are respectively positioned at the two sets of the opposing pin stands 251, 252. The breaks 251a of the pin stands 251 respectively receive the necks 320 of the fixing pins 300 and the breaks 252a of the pin stands 252 respectively receive the bodies 330 of the fixing pins 300, wherein the break 251a has a width that is smaller than the outer diameters of the head 310 and body 330.

Figure 5A:
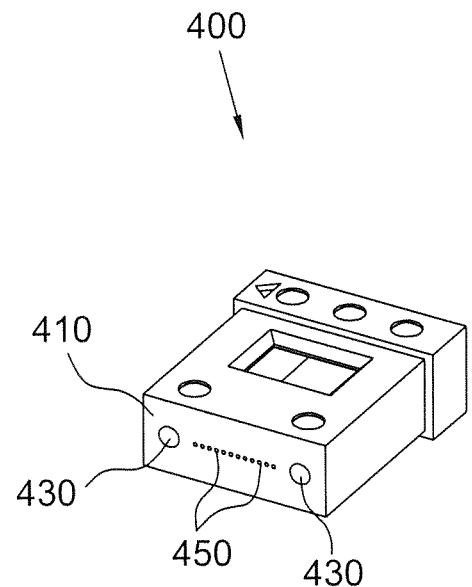
FIG. 5a is an elevated perspective view of the optical fiber connector of the optical module of the present disclosure.
Figure 5B:
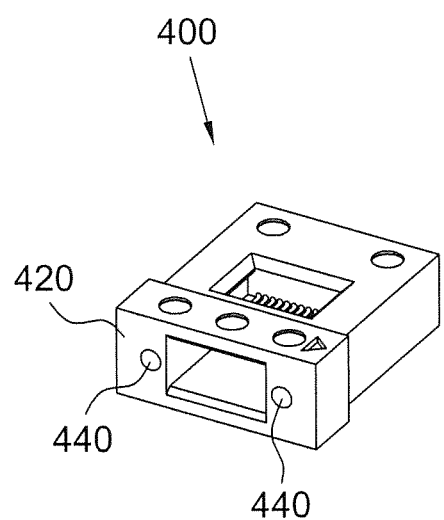
FIG. 5b is another elevated perspective view of the optical fiber connector of the optical module of the present disclosure.

The optical module of the present disclosure includes the apparatus of fixing optical module of FIG. 4 and the optical fiber connector 400 illustrated in FIGS. 5a and 5b. The optical fiber connector 400 is generally of rectangular shape and includes an array of the optical fibers 450 exposed out from the front surface 410. Two circular openings 430 are formed on the front surface 410 of the optical fiber connector 400 and are respectively located on opposing sides of the array of the optical fibers 450 to respectively receive the two fixing pins 300. Further, two circular openings 440 are formed on the rear surface 420 of the optical fiber connector 400 to respectively receive the protrusions 234 at the engagement portions 230 of the fixing frame 200. In one embodiment, the openings 430 are respectively in communication with the openings 440, and the openings 430, 440 may be opposing openings at two ends of a through opening.

Figure 1:
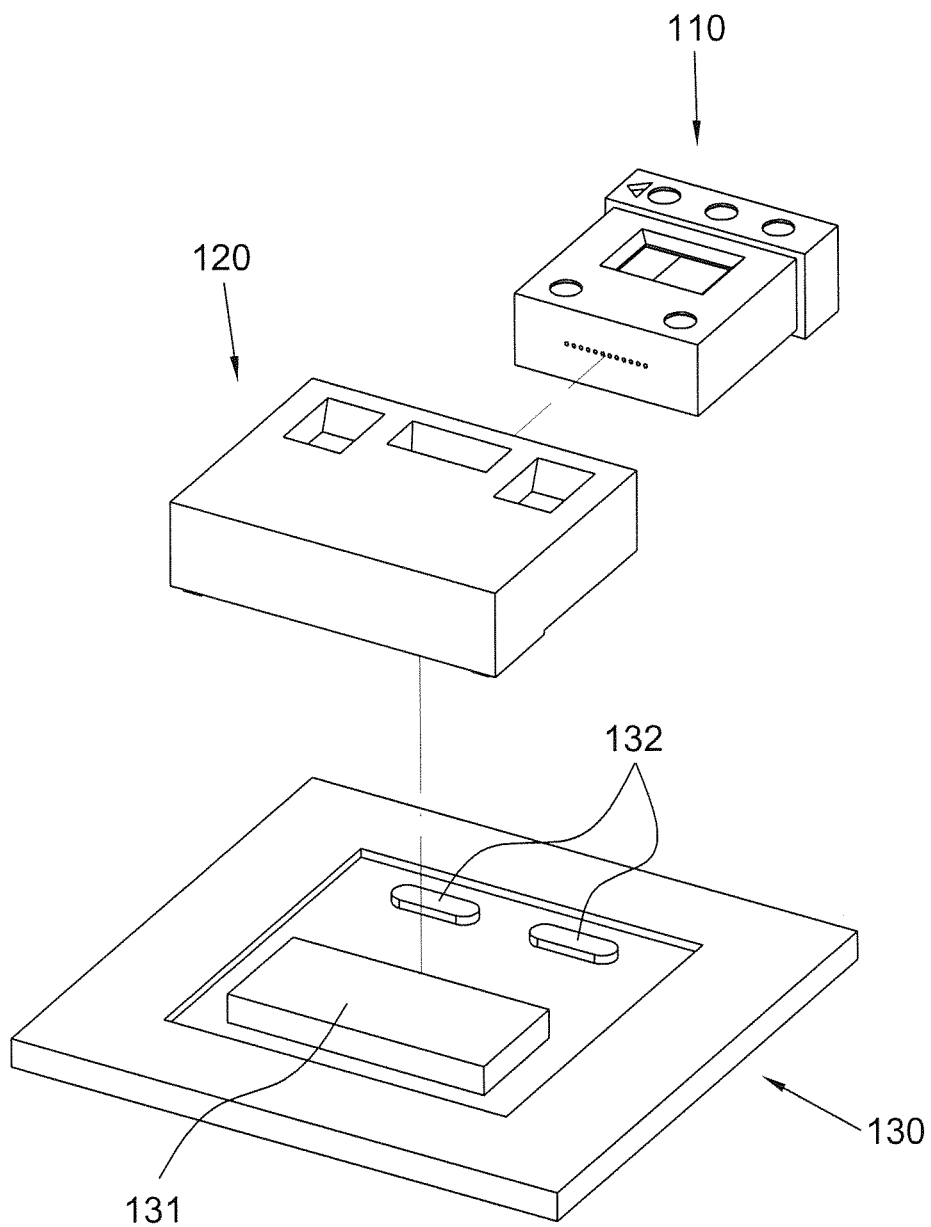
FIG. 1 is an exploded view of a conventional optical engine.
Figure 6A:
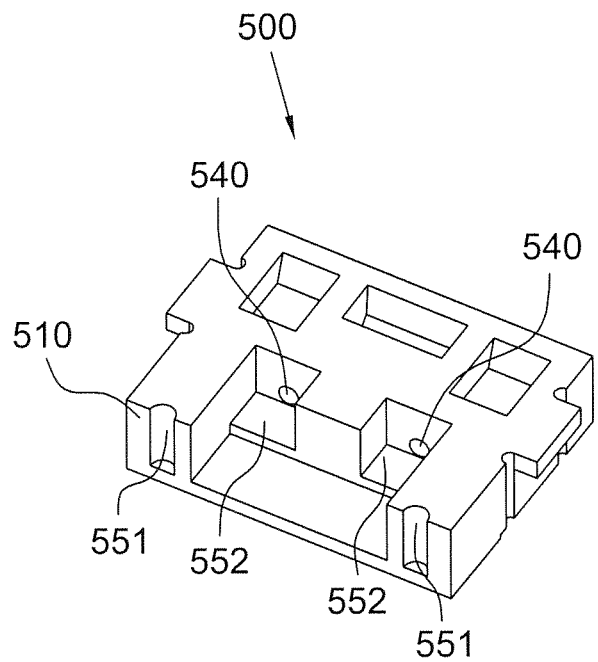
FIG. 6a is an elevated perspective view of the optical lens block of the optical module of the present disclosure.
Figure 6B:
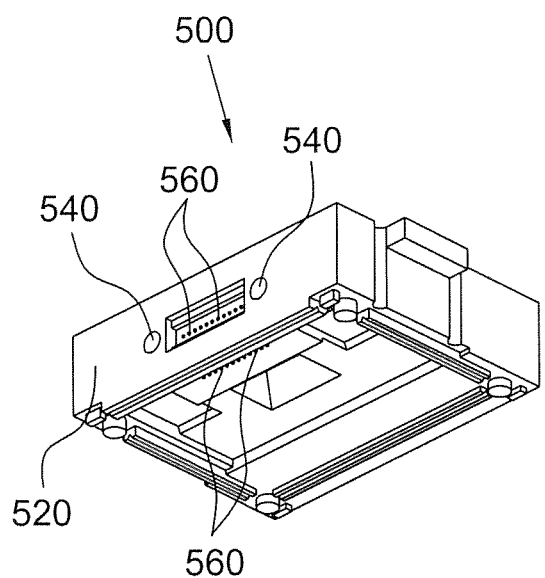
FIG. 6b is another elevated perspective view of the optical lens block of the optical module of the present disclosure.

Reference is now made to FIGS. 6a and 6b, the optical module of the present disclosure further includes an optical lens block 500. The optical lens block 500 is generally of rectangular shape and has two indentations 552 formed thereon. Two depressions 551 are formed on the front surface 510 of the optical lens block 500 upon which the elastic sheets 240 of the fixing frame 200 may respectively press. The optical lens block 500 further has two openings, for example through openings 540 extending forward from the rear surface 520 through to being respectively in communication with the indentations 552. The fixing pins 300 are sized in close fit with the through openings 540 and allow inserting into the through openings 540 from the indentations 552 and protruding from the rear surface 520, respectively. In addition, the optical lens block 500 still further includes optically transparent material 560 to serve the purpose of coupling light between the active optical chips 132 on the printed circuit board 130 illustrated in FIG. 1 and the optical fibers 450 in the optical fiber connector 400.

Figure 7A:
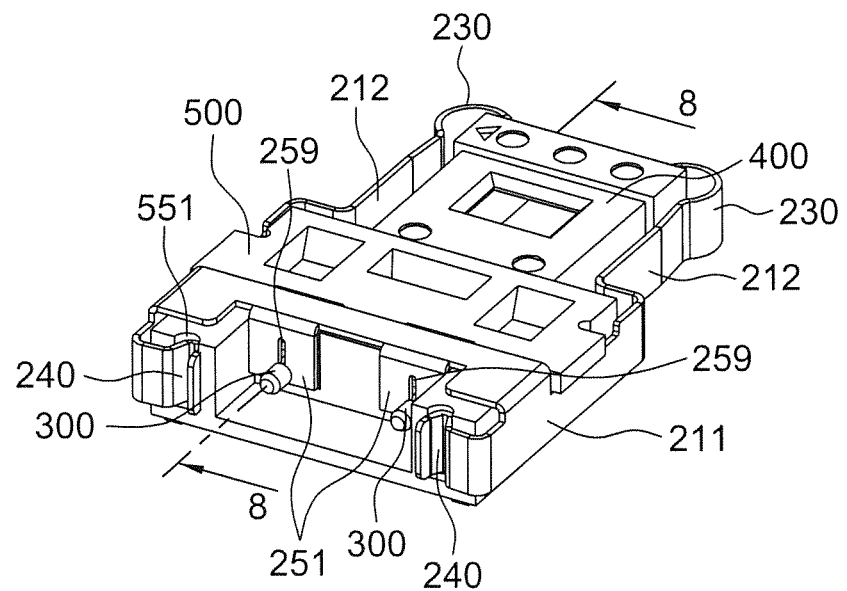
FIG. 7a is an elevated perspective view of the optical module of the present disclosure.
Figure 7B:
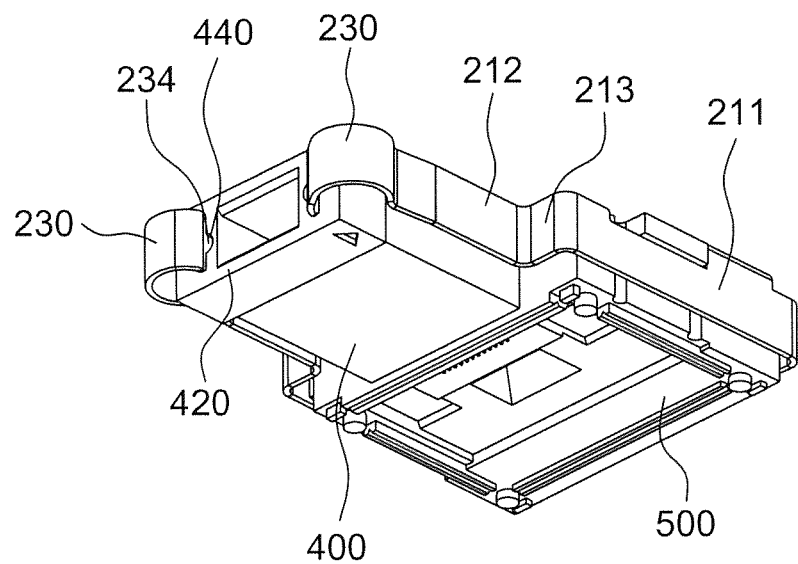
FIG. 7b is another elevated perspective view of the optical module of the present disclosure.
Figure 8:
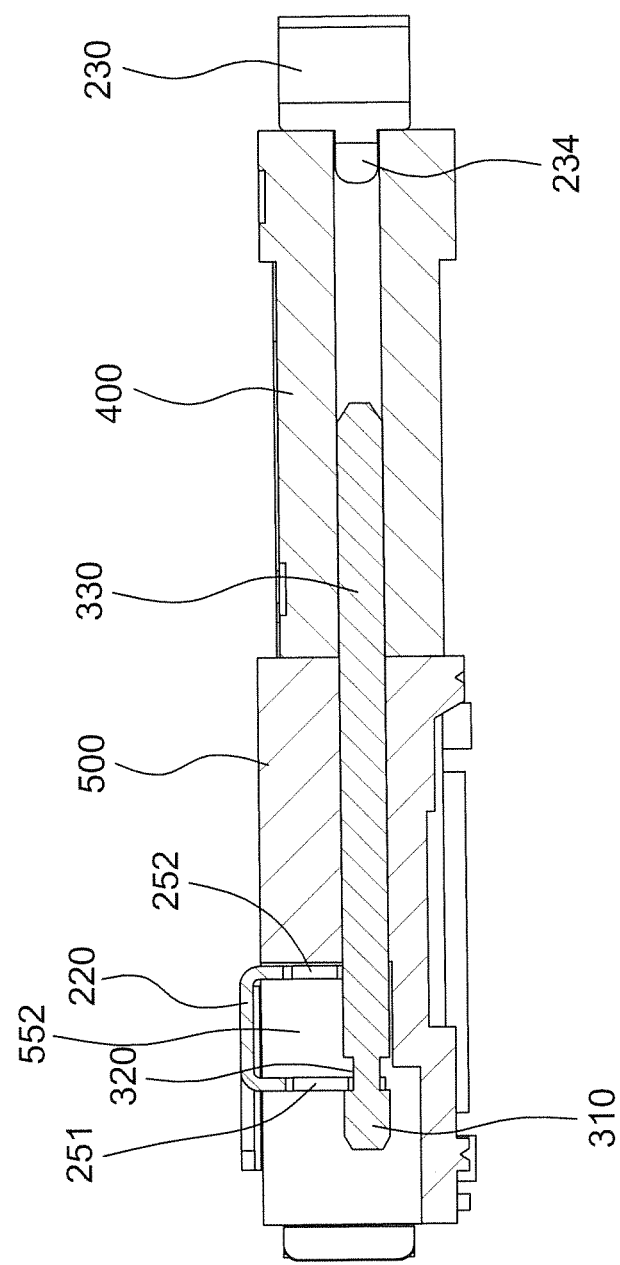

Reference is now made to FIGS. 7a, 7b and 8, the optical lens block 500 is positioned between the front sections 211 of the two fixing arms 210 and the optical fiber connector 400 is positioned between the rear sections 212 of the two fixing arms 210 according to the optical module of the present disclosure. The fixing pins 300 are positioned at the pin stands 251, 252. The bodies 330 of the fixing pins 300 respectively insert into the through openings 540 from the indentations 552 and protrude from the rear surface 520 and finally enter the openings 430 at the optical fiber connector 400. The elastic sheets 240 of the fixing frame 200 press upon the front surface 510 of the optical lens block 500, for example respectively in the two depressions 551 to push the optical lens block 500 toward the optical fiber connector 400. The rear ends of the elastic engagement portions 230 respectively press upon the rear surface 420 of the optical fiber connector 400 to push the optical fiber connector 400 toward the optical lens block 500. The protrusions 234 formed at the rear ends of the engagement portions 230 are respectively inserted into the openings 440 to prevent the engagement portions 230 from sliding on the rear surface 420 of the optical fiber connector 400.

According to the optical module of the present disclosure, the fixing pins 300 are sized in close fit with the through openings 540 and the openings 430 to restrict the transverse movement between the optical lens block 500 and the optical fiber connector 400. The elastic sheets 240 and the engagement portions 230 are provided to push the optical lens block 500 and the optical fiber connector 400 toward each other an that a stable optical-coupling may be formed between the optical lens block 500 and the optical fiber connector 400.

According to the optical module of the present disclosure, the fixing frame 200 and the fixing pins 300 may keep the stable optical-coupling between the optical lens block 500 and the optical fiber connector 400.

Although the preferred embodiments of the disclosure have been disclosed for illustrative purposes, those skilled in the art will appreciate that various modifications, additions and substitutions are possible, without departing from the scope and spirit of the disclosure as disclosed in the accompanying claims.

What is claimed is:

1. An optical module, comprising:
    an optical lens block having a first opening;
    an optical fiber connector optically coupled to the optical lens block, the optical fiber connector having a second opening;
    a fixing sheet;
    a fixing pin inserted into the first and second openings;
    a first pin stand extending from the fixing sheet, the first pin stand having a break to receive the fixing pin;
    two fixing arms oppositely coupled to the fixing sheet, wherein the optical lens block and the optical fiber connector are positioned between the fixing arms;
    two elastic sheets respectively coupled to front ends of the fixing arms, wherein the elastic sheets press upon the optical lens block and push the optical lens block toward the optical fiber connector; and
    two elastic engagement portions respectively coupled to rear ends of the fixing arms, wherein the engagement portions press upon the optical fiber connector and push the optical fiber connector toward the optical lens block.

2. The optical module as claimed in claim 1, wherein the fixing pin comprising:
a head;
a body; and
a neck connecting with the head and the body,
wherein the neck has an outer diameter that is smaller than outer diameters of the head and the body,
wherein the break has a width that is smaller than the outer diameters of the head and the body, and
wherein the neck is positioned in the break.

3. The optical module as claimed in claim 2, further comprising:
a second pin stand extending from the fixing sheet, wherein the second pin stand has a break to receive the body of the fixing pin.

4. The optical module as claimed in claim 3, wherein the first pin stand and the second pin stand perpendicularly extend respectively from two opposing sides of the fixing sheet.

5. The optical module as claimed in claim 1, wherein the optical lens block is formed with two depressions, the elastic sheets respectively press in the depressions.

6. The optical module as claimed in claim 1, wherein the optical fiber connector has two third openings, the optical module further comprising:
two protrusions respectively protruding from the engagement portions, wherein the protrusions are respectively inserted into the third openings.

7. The optical module as claimed in claim 1, wherein the optical lens block is formed with an indentation, and the first pin stand is positioned in the indentation.

8. The optical module as claimed in claim 1, wherein the fixing pin is detachable from the optical lens block and the optical fiber connector.

9. The optical module as claimed in claim 1, wherein the fixing pin is positioned in the optical lens block and protrudes from two opposing sides of the optical lens block.

10. An apparatus of fixing optical module, comprising:
a fixing sheet;
a fixing pin;
a first pin stand extending from the fixing sheet, the first pin stand having a break to receive the fixing pin;
two fixing arms oppositely coupled to the fixing sheet;
two elastic sheets respectively coupled to front ends of the fixing arms; and
two elastic engagement portions respectively coupled to rear ends of the fixing arms,
wherein the elastic sheets are configured to press upon an optical lens block and push the optical lens block toward an optical fiber connector,
wherein the engagement portions are configured to press upon the optical fiber connector and push the optical fiber connector toward the optical lens block, and
wherein the fixing pin is configured to insert into the optical lens block and the optical fiber connector.

11. The apparatus as claimed in claim 10, wherein the fixing pin comprising:
a head;
a body; and
a neck connecting with the head and the body,
wherein the neck has an outer diameter that is smaller than outer diameters of the head and the body,
wherein the break has a width that is smaller than the outer diameters of the head and the body, and
wherein the neck is positioned in the break.

12. The apparatus as claimed in claim 11, further comprising:
a second pin stand extending from the fixing sheet, wherein the second pin stand has a break to receive the body of the fixing pin.

* * * * *